US010223791B2

(12) United States Patent
Dickrell et al.

(10) Patent No.: US 10,223,791 B2
(45) Date of Patent: Mar. 5, 2019

(54) SYSTEM FOR DIAGNOSING DISEASE USING SPATIAL AREA NORMALIZATION ANALYSIS

(71) Applicants: UNIVERSITY OF FLORIDA RESEARCH FOUNDATION, INC., Gainesville, FL (US); SENTINEL DIAGNOSTIC IMAGING, INC., Gainesville, FL (US)

(72) Inventors: Daniel John Dickrell, Gainesville, FL (US); David L. Meadows, Colleyville, TX (US)

(73) Assignees: University of Florida Research Foundation, Inc., Gainesville, FL (US); Sentinel Diagnostic Imaging, Inc., Gainesville, FL (US)

( * ) Notice: Subject to any disclaimer, the term of this patent is extended or adjusted under 35 U.S.C. 154(b) by 126 days.

(21) Appl. No.: 15/302,598

(22) PCT Filed: Apr. 10, 2015

(86) PCT No.: PCT/US2015/025317
§ 371 (c)(1),
(2) Date: Oct. 7, 2016

(87) PCT Pub. No.: WO2015/157640
PCT Pub. Date: Oct. 15, 2015

(65) Prior Publication Data
US 2017/0032524 A1 Feb. 2, 2017

Related U.S. Application Data

(60) Provisional application No. 61/978,483, filed on Apr. 11, 2014.

(51) Int. Cl.
| G06K 9/00 | (2006.01) |
| G06T 7/00 | (2017.01) |
| G06T 11/00 | (2006.01) |
| G06T 7/11 | (2017.01) |

(52) U.S. Cl.
CPC .............. G06T 7/0014 (2013.01); G06T 7/11 (2017.01); G06T 11/001 (2013.01);
(Continued)

(58) Field of Classification Search
None
See application file for complete search history.

(56) References Cited

U.S. PATENT DOCUMENTS

| 8,212,814 B2 | 7/2012 | Branets et al. |
| 8,358,819 B2 | 1/2013 | Wu et al. |
(Continued)

OTHER PUBLICATIONS

Al-Shammari et al.; "Re-evaluating the Use of Voronoi Tessellations in the Assessment of Oxygen Supply from Capillaries in Muscle"; Bull Math Biol; 74; 2012, pp. 2204-2231.
(Continued)

Primary Examiner — Stephen P Coleman
(74) Attorney, Agent, or Firm — Thomas | Horstemeyer, LLP

(57) ABSTRACT

Disclosed herein is a method comprising a method comprising imaging a network section through which flow occurs; where the flow is selected from a group consisting of fluid, electrons, protons, neutrons and holes; partitioning the image into sub-regions based on metabolic need and function; where each region comprises one or more sources and one or more sinks; where the flow emanates from the source and exits into the sinks; generating a Voronoi diagram from the Delaunay triangulation by subdividing the sub-regions into Voronoi cells, where each Voronoi cell contains exactly one sink or one source; and where the intersections of Voronoi cells are Voronoi cell vertices; calculating a flow rate in each Voronoi cell; and according a color to Voronoi cells based on their flow rates; where Voronoi cells having similar rates are accorded similar colors.

14 Claims, 4 Drawing Sheets

(52) U.S. Cl.
CPC ............... *G06T 2207/30016* (2013.01); *G06T 2207/30041* (2013.01); *G06T 2207/30048* (2013.01); *G06T 2207/30061* (2013.01); *G06T 2207/30068* (2013.01); *G06T 2207/30084* (2013.01); *G06T 2207/30101* (2013.01); *G06T 2207/30104* (2013.01)

(56) References Cited

U.S. PATENT DOCUMENTS

| 8,488,863 B2 | 7/2013 | Boucheron |
| 2003/0036083 A1 | 2/2003 | Tamez-Pena et al. |
| 2010/0278405 A1 | 11/2010 | Kakadiaris et al. |
| 2013/0138406 A1 | 5/2013 | Khvoenkova et al. |
| 2013/0195335 A1 | 8/2013 | Gorman et al. |

OTHER PUBLICATIONS

International Search Report for International Application No. PCT/US2015/025317, International Filing date Apr. 10, 2015, dated Jul. 8, 2015, 6 pages.
Karch et al.; "A Gibbs point field model for the spatial pattern of coronary capillaries"; Physica A; 369; 2006, pp. 599-611.
Karch et al.; "The spatial pattern of coronary capillaries in patients with dilated, ischemic, or inflammatory cardiomyopathy"; Cardiovascular Pathology; 14; 2005, pp. 135-144.
Miu, "Lecture 7: Voronoi Diagrams"; Massachusetts Institute of Technology, Computational Geometry Lecture; 2001, Retrieved Jun. 12, 2015, <http://nms.Ics.mit.edu/~aklmiu/6.838/L7.pdf>, 89 pages.
Written Opinion for International Application No. PCT/US2015/025317, International Filing date Apr. 2015, dated Jul. 8, 2015, 6 pages.

SYSTEM FOR DIAGNOSING DISEASE USING SPATIAL AREA NORMALIZATION ANALYSIS

CROSS REFERENCE TO RELATED APPLICATIONS

This application is a National Stage application of PCT/US2015/025317, filed Apr. 10, 2015, which claims the benefit of U.S. Provisional Application No. 61/978,483, filed Apr. 11, 2014, both of which are incorporated by reference in their entirety herein.

BACKGROUND

This disclosure relates to systems and to methods for analyzing objects that contain a flow field and whose features appear to develop randomly. It relates to systems and to methods for measuring apparent random patterns and pathways in structures that contain flow fields. In particular, this disclosure relates to systems and to methods for diagnosing disease using spatial area normalization analysis.

Seemingly or apparent random patterns and pathways are often a part of systems and objects that occur naturally and that generally contain a flow field. An example of a naturally occurring random pathway is a river that travels across the landscape. The river possesses several bends and tributaries and it is often difficult to predict which section of the river will contain a bend or a tributary. Another example of a naturally occurring random pathway is the path taken by blood vessels in the eyeball, the heart, the lungs, the brains, or other parts of a living being. Blood vessels have a number of branches and it is difficult to predict where these branches will occur, the number of branches and the average orientation of these branches that a particular part (e.g., the heart, the eyeball, and the like) of a particular living being will have. A tree is another example of a naturally occurring structure whose branches take random pathways and the point of contact of one branch with another is an apparently random event. All of the aforementioned examples—the river, the blood vessels and the tree contain flow fields.

The ability to determine and to measure the structure of such apparently random objects permits predictive capabilities for the design of future objects. It also permits a comparison of one set of the objects (that are grown or developed under one set of circumstances) with another set of equivalent objects (that are grown or developed under a second set of circumstances). It is therefore desirable to develop methods that can be used to measure the structures and to quantify their features so that they can be compared with one another and to predict the behavior of future objects.

SUMMARY

Disclosed herein is a method comprising a method comprising imaging a network section through which flow occurs; where the flow is selected from a group consisting of fluid, electrons, protons, neutrons and holes; partitioning the image into sub-regions based on metabolic need and function; where each region comprises one or more sources and one or more sinks; where the flow emanates from the source and exits into the sinks; generating a Voronoi diagram from the Delaunay triangulation by subdividing the sub-regions into Voronoi cells, where each Voronoi cell contains exactly one sink or one source; and where the intersections of Voronoi cells are Voronoi cell vertices; calculating a flow rate in each Voronoi cell; and according a color to Voronoi cells based on their flow rates; where Voronoi cells having similar rates are accorded similar colors.

Disclosed herein too is a system for performing a constructal analysis, the system comprising a processor and a memory to perform a method comprising initiating capture of an image of an apparent random pathway, pattern, or network in a subject; where the apparent random pathway, pattern or network comprises a flow field; partitioning the image into sub-regions based on metabolic need and function; where each region comprises one or more sources and one or more sinks; where the flow emanates from the source and exits into the sinks; generating a Voronoi diagram from the Delaunay triangulation by subdividing the sub-regions into Voronoi cells, where each Voronoi cell contains exactly one sink or one source; and where the intersections of Voronoi cells are Voronoi cell vertices; calculating a flow rate in each Voronoi cell; and according a color to Voronoi cells based on their flow rates; where Voronoi cells having similar rates are accorded similar colors.

BRIEF DESCRIPTION OF THE FIGURES

FIG. 3 is a healthy area-normalized flow analysis image and shows uniform, well-distributed blood flows around the fovea (image center). The depicted areas of warmer color quickly allow for assessment of the regions containing sufficiently adequate and sufficient flow; FIG. 4 shows an unhealthy area-normalized flow image shows deficient regions of flow based on the same color scale map used in the FIG. 3. Situations where both functional intensity (e.g., flow rate) and area of responsibility (Voronoi cell area) are important, such as this retinal blood flow map, demonstrate the utility of this tool.

DETAILED DESCRIPTION

Disclosed herein is a system that can be used to analyze images of objects that contain an apparently random pattern or network that contains a flow field. The method involves obtaining an image and segmenting this image into regions of interest. The image is one of a flow stream that contains a flow field such as a retinal vasculature fundus image, and image of the vessels of the brain, an image of the vessels of the heart, and image of a river taken from a satellite, or the like. The image of the flow field is saved to a storage device such as the memory drive of a computer. The computer is provided with algorithms that can isolate the flow streams from the background of the image. The flow stream endpoints are located and stored for later reference. Other points along the flow stream may also be stored for later reference.

A Voronoi diagram is generated from the flow stream endpoint locations. The diagram partitions the area into sub-regions. Each sub-region is the portion of the image that is closest to a single individual endpoint, denoting areas of vascular "responsibility" to deliver flow. The Voronoi cells that are wholly contained within the image (ones that have all vertices of the cell visible inside the image) are colored by various normalization parameters. Healthy images with spatially normalized areas of performance are colored.

Figure 1:
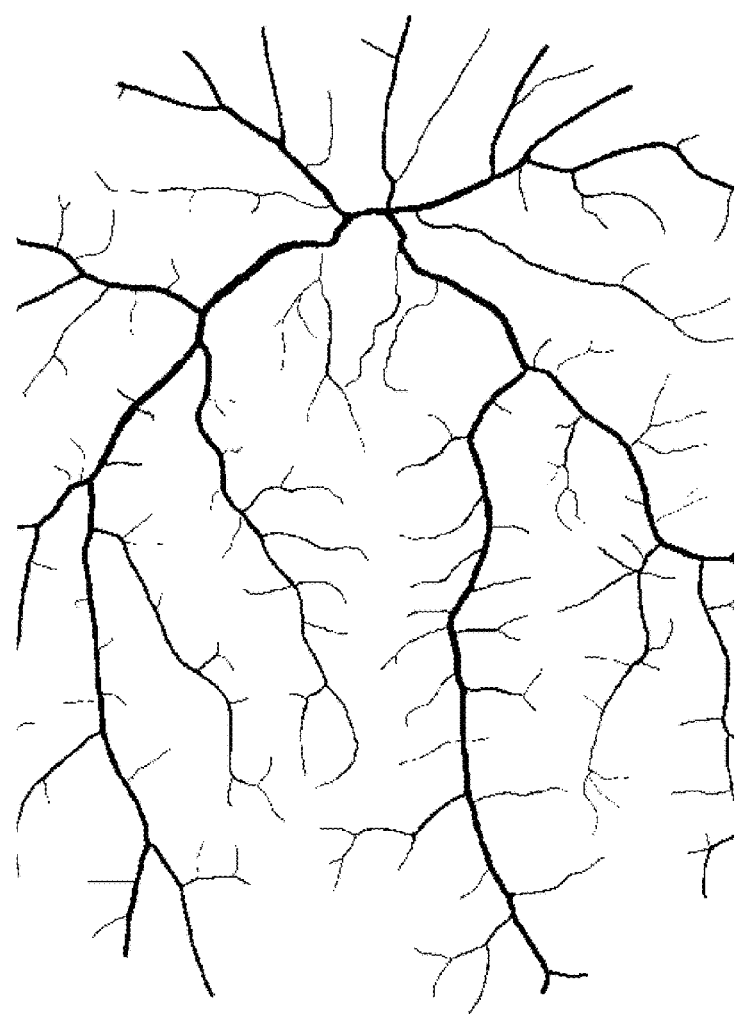
FIG. 1 is a medical image of retinal vasculature.
Figure 2:
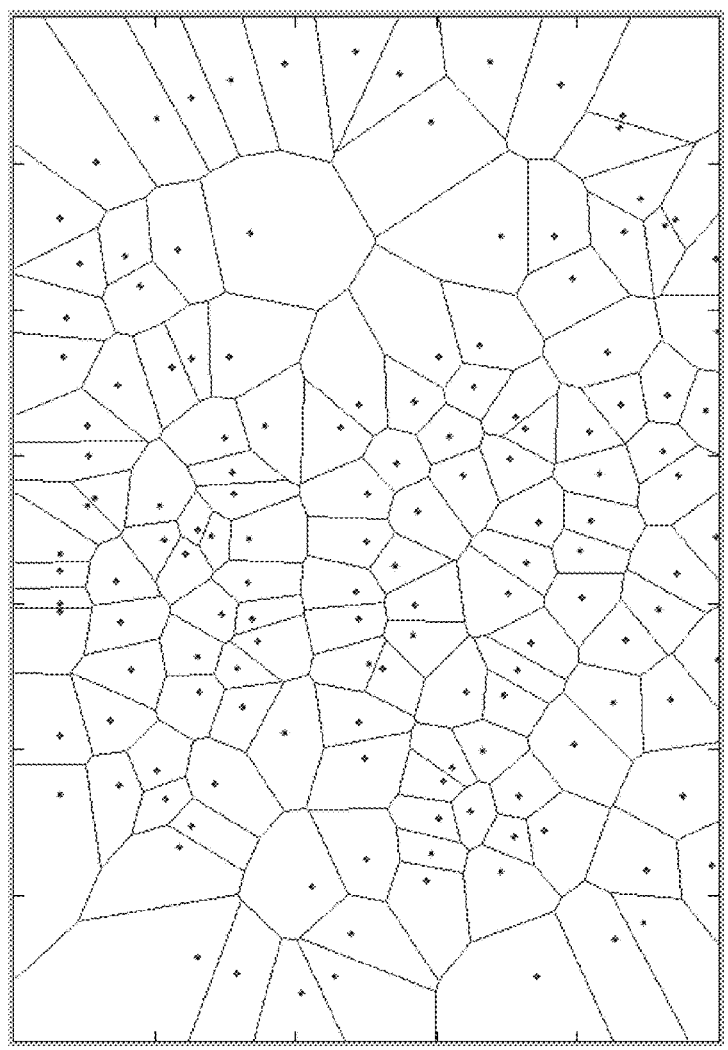
FIG. 2 shows a Voronoi diagram that is generated from the vessel endpoint locations.

FIG. 1 is a medical image of retinal vasculature. The image is segmented into the regions of interest. In this case, the blood vessels are isolated from the image background. The vessel endpoints are located and stored for later reference. FIG. 2 shows a Voronoi diagram that is generated from the vessel endpoint locations. The diagram partitions the area into sub-regions. Each sub-region is the portion of the image that is closest to a single individual endpoint, denoting areas of vascular "responsibility" to deliver flow The image in the FIG. 3 (is the image of the FIG. 1) where cells that have higher than average blood flow per unit area have hotter colors. In other words, hotter colors (reds, pinks, and the like) correspond to areas of above average blood supply. Duller colors (blues, greys, beiges, and the like) correspond to areas of less than average blood supply. By comparing the areas covered by the hotter colors to those covered by the duller colors, one can ascertain the quality of the flow field. For example, in the case of the FIG. 1, a ratio of hotter colors to duller colors may be used to determine the quality of the vessels of eye.

Figure 3:
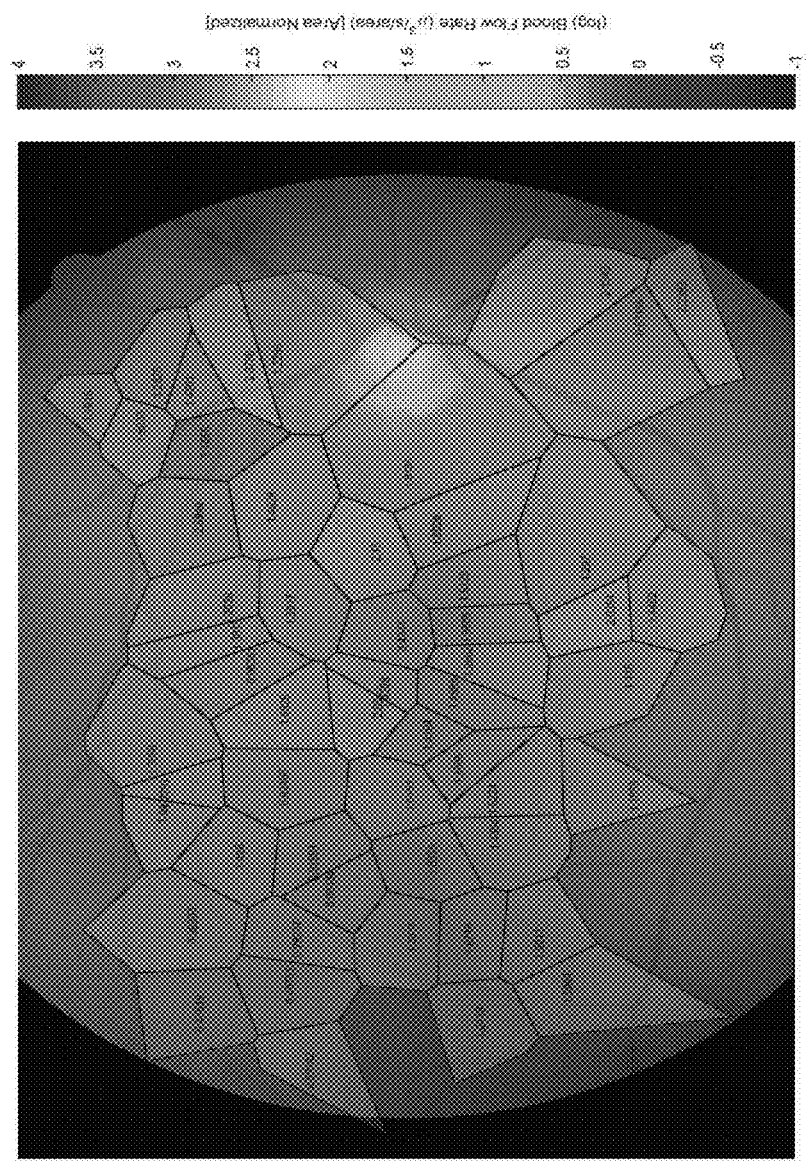
FIG. 3 is a depiction of a colored graph of a healthy eye where Voronoi cells that have higher than average blood flow per unit area have hotter colors.
Figure 4:
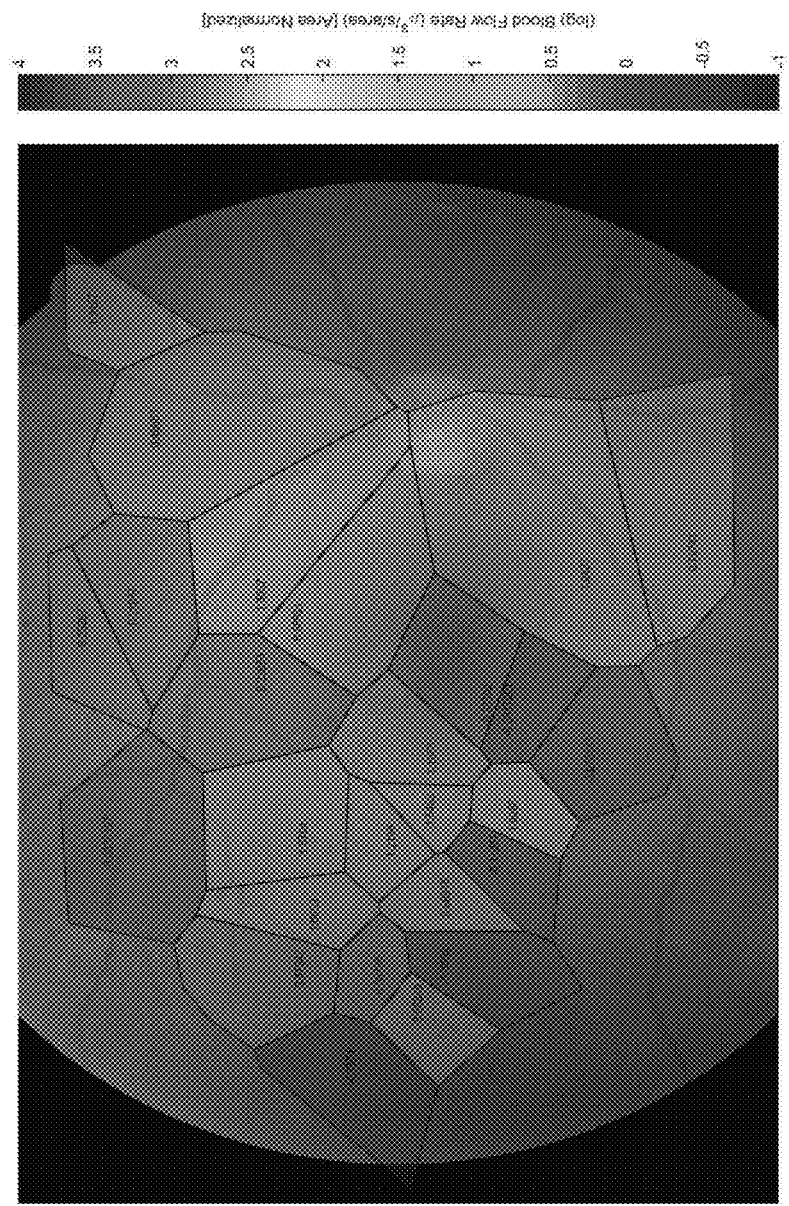
FIG. 4 is a depiction of a colored graph of a diseased eye showing a diseased network with spatially normalized areas of performance colored.

This method allows for quick assessment of disease based on the size, distribution, and coloring of the cells. For example, the FIG. 4 shows the diseased image with spatially normalized areas of performance colored. The quantitative differences of the FIG. 4 from the image of FIG. 3 are clearly evident. The FIG. 3 shows larger regions having hotter colors, while the FIG. 4 shows smaller regions of hotter colors than those present in the FIG. 3.

In one embodiment, this system imports an image (e.g., a medical image of the vasculature of the lungs, brains, heart, eyes, or the like, a topographical image of a stream or a river, electrical circuitry where electrical percolation is desirable, or the like) and uses spatial analysis methods (e.g., Voronoi diagrams, Delaunay triangulations, network topology, and the like) to determine the organization of biological or other topographical structures contained in the image and combines the spatial analysis with quantitative performance metrics of the imaged structure to determine its performance. This analysis of the performance of the flow field can then be used to determine whether the flow field is performing efficiently (i.e., it is upto par) or performing inefficiently (i.e., it is diseased or damaged). In another embodiment, the analysis can provide information on how to enable an improved performance of the flow field.

The method is advantageous in that it can be applied to any apparently random pattern, pathway, or network whose connections can be calculated and performance can be measured. Apparent random patterns, pathways, or networks are capable of being analyzed by this method to diagnose improper functions and disease. A novel aspect of this disclosure is the combination of spatial feature imaging with functional performance metrics (e.g., the flow resistance or conductance, flow volume, pressure and viscosity of fluid, and the like) in a computational tool that can directly diagnose medical abnormalities from the raw input image. The method can also be used to design and to synthesize prosthetics (or replacement parts) for existing organisms or to correct for damages in other flow systems (e.g., streams, rivers, complex electrical circuits, semiconductors, and the like).

In an exemplary embodiment, the method can be used to estimate brain function and brain morphology and topology. It can also be used to distinguish functional portions of the brain from damaged or non-functional portions of the brain. For example, a functional magnetic resonance image (fMRI) of a human brain shows local regions of activity within the three-dimensional volume of the brain Using the spatial distribution of the areas of interest within the brain extracted from the image (the interconnected-ness of the regions) and combined with the performance metrics (from the fMRI analysis) this method would quantitatively determine differences between healthy brain activity and unhealthy brain activity. While the foregoing is directed to describing how the brain may be analyzed, the system and the method are not restricted to examining the brain, but can be used to analyze other parts of the body such as the eyes, the lungs, the heart and other parts of the vascular system. This method of analysis may also be used to repair other flow systems (e.g., streams and rivers that have been damaged from floods, droughts, and the like).

In another embodiment, the system and the methods described herein can be used to measure the apparently random pattern, pathway, or network and be used to characterize its features such as its end to end distance, its radius of gyration, its tortuosity, the ability of the structure to permit a fluid to flow through it, atomic and sub-atomic particles (e.g., electrons, protons, photons, holes, and the like), energy, and the like, to flow through it. In one exemplary embodiment, features of the random pattern, pathway, or network can be characterized using spatial analysis so long as it involves a flow along the apparently random pattern, pathway, or network. The system disclosed herein can also be used to deduce information about the neighborhood surrounding the apparently random patterns, pathways, and networks. It can also be used to study the events surrounding a series of events so long as the series of events are affected by the event.

The term "seemingly" or "apparent" or "apparently" is used because the pathways, patterns or networks described herein appear to be random (i.e., they have tortuous pathways that appear to be random), but can actually be characterized using thermodynamic concepts such as the "efficiency of the system" "boundary conditions", "energy minimization", "guiding forces", "design constraints", "minimization of losses" or the like. The apparent pathway, pattern or network may also be characterized as a naturally occurring pathway, patterns or network and comprises a flow field. It can also be called a transport network since it transports a fluid, atomic and sub-atomic particles, energy, or the like.

The term "seemingly" or "apparent" or "apparently" is used because the pathways, patterns or networks described herein can be mathematically characterized in addition to being statistically characterized. A truly random pattern or network can only be statistically characterized, while a seeming or apparent network can be mathematically characterized without the use of statistical terms such as standard deviations, mean, and the like. The mathematical characterization involves transport parameters of the system such as flow conductance or resistance, flow volume, flow viscosity, sedimentation rate, or the like in addition to structural parameters such as the radius of gyration, tortuosity, number of contact points between different sections of the network, and the like.

The resulting analysis and the data obtained therefrom can be used to compare a first random pattern, pathway, network, or a series of events with a second random pattern, pathway, network, or a series of events that is grown or developed under different circumstances, or at another location, or at another time in the same or different location. The comparison can be used to assess the quality of the first random pattern, pathway, network, or a series of events with respect to the second random pattern, pathway, network, or series of events. The resulting analysis, the data obtained therefrom and any data pertaining to the comparison can be transmitted to a screen, printed out on a sheet, saved and stored on a solid state drive, a hard disc drive or a floppy disc.

The system comprises an imaging device in operative communication with a computer that contains code or software to analyze a portion of the image and to provide various parameters that characterize the pathway, pattern, network, or random series of events. The code or software comprises an image processing algorithm that can measure one or more features of the image and can provide details about an analyzed feature of the image using constructal analysis.

Disclosed herein too is a method that can be used to analyze images of objects that contain a random pattern, pathway, network, or series of events. The method comprises capturing an image of a random pathway, pattern, network, or a series of events, or the like. The image is then transmitted to a computer (e.g., a device having a memory and a processor) where an algorithm may be initiated to separate the flow field from the background of the image. Parameters of the flow field such as end points can be measured. These parameters can be used to determine the quality or condition of the flow field.

As noted above, the method comprises obtaining an image of the organ (e.g., heart, eye, brain, lung, and the like) or object (e.g., semiconductor, non-intrinsically conducting electrical materials such as conductive polymers, and the like). The image of the organ or object is partitioned into sub-regions based on metabolic need and function. For example, if the image is one of the brain, its metabolic need is glucose and it's function is to transmit neurons. The needs of the sub-regions are then determined. The needs of the sub-regions are determined on a volumetric basis (e.g., amount of glucose per unit volume or volumetric blood flow), on a functional basis (e.g., neurons per unit of glucose), or the like. It is to be noted that this approach is also applicable to electrical or pneumatic distribution in systems that use electricity and or fluids for functioning.

The subdividing of the image may be conducted by a variety of different methods. For example, given the source $S_o$ and sink $k_{1 \ldots N}$ locations of an arterial network, a Delaunay triangulation (DT) tessellation connecting the source and sink delivery locations may be constructed. A Delaunay triangulation for a set P of points in a plane is a triangulation DT(P) such that no point in P is inside the circumcircle of any triangle in DT(P). Delaunay triangulations maximize the minimum angle of all the angles of the triangles in the triangulation. In other words, the Delaunay triangulation of a point set is a collection of edges satisfying an "empty circle" property: for each edge a circle can be found that containing the edge's endpoints but not containing any other points.

A Voronoi diagram (VD) is generated from the Delaunay triangulation, subdividing the larger region into sub-regions. A Voronoi diagram is a geometric structure that represents proximity information about a set of points or objects. Given a set of sites or objects, the plane is partitioned by assigning to each point its nearest site. The points whose nearest site are not unique, form the Voronoi diagram. That is, the points on the Voronoi diagram are equidistant to two or more sites. So for a set S of n sites, the Voronoi diagram VD(S) is the partition of the plane into blocks of points with the same nearest site or sites.

The areas of the Voronoi diagram are then color coded based upon the amount of blood flow in different sub-regions. The processing of the image to determine blood flow (and hence coloring) in the sub-regions begins by obtaining a binary image of the flow stream (i.e., the flow network). The image is a pixelated image with white pixels being equivalent to the flow stream (e.g. the vasculature) and dark pixels representing the background. A determination is made of the total number of particles (discrete areas of white pixels) and other pixels (i.e. all particles) but the one comprising of the most pixels are removed. In other words, the imaged flow stream is smoothed out to a series of points that represent the highest pixel density along the path of the flow stream. A thinning algorithm is then used that reduces the network to paths with widths of one pixel. Any "spurs" or small lengths of network containing endpoints are then removed. A flow source (i.e., a series of interconnected arteries or veins through which flow occurs) in the image is then used for further study by manually selecting a suitable area in the image as follows.

Manually select the left and right edges of the optic disc to determine a pixel-to-micron ratio based on a diameter of 1.76 mm. Determine all endpoints and junctions in the network by analyzing each flow streams pixel's connectivity to neighboring pixels. Define the network by "walking" along the flow streams network from each junction. The following are determined:

Nodes—junctions, endpoints, or the flow source area.
Segments—lengths of pixels connecting nodes The width of all segments in the vascular network in the optical disc are determined by performing a principal component analysis on the thinned segment, then taking N perpendicular measurements along the segment in the binary image and averaging the measurements. N is generally between 3 and 7. Determine the lengths of segments by accumulating and summing up pixel-to-pixel lengths from one end of a segment to the other. To pixels sharing a side of the segment add a length of 1.0 while for pixels sharing a corner of the segment, add a length of 1.41 multiplied by the length of the side of the pixel.

Determine the generation of each segment by attributing a generation number of "1" to each segment connected to the flow source. Each bifurcation thereafter adds a generational number to the child segments. For example, a child segment that branches of a main segment is given the number 1, while a $2^{nd}$ child segment that branches of the $1^{st}$ child segment is given the number 2, and so on. Determine the viscosity in each segment based on its diameter and an assumed hematocrit level (e.g., if the flow stream involves vasculature). The haematocrit (Ht or HCT), also known as packed cell volume (PCV) or erythrocyte volume fraction (EVF), is the volume percentage (%) of red blood cells in blood. It is normally about 45% for men and 40% for women. It is considered an integral part of a person's complete blood count results, along with hemoglobin concentration, white blood cell count, and platelet count. Determine the fluid conductance in each segment using the Hagen-Poiseuille equation.

In short, as detailed above, after isolating a portion of a binarized flow system (or an equivalent flow system such as a vasculature, and the like), extraneous rough edges and small segment lengths are removed. Segment widths and lengths are calculated and each generational segment is assigned a numerical value depending upon its location from the main segment. The viscosity of fluids being transported through the segments is then computed. The flow in each segment and in the entire binarized flow network (e.g., vascular system) is then determined using the Hagen-Poiseuille equation.

$$\Delta P = \frac{8\mu L Q}{\pi r^4} \quad (1)$$

where $\Delta P$ is the pressure loss through the segment; L is the length of segment; $\mu$ is the dynamic viscosity; Q is the volumetric flow rate through the segment; and r is the radius of the segment.

For each segment endpoint, determine a virtual bifurcating network whose relative diameter is a function of Murray's Law and relative length is a function of data found in the literature. Murray's law, or Murray's principle is a formula for relating the radii of child segments to the radii of the parent segment of a lumen-based system. The branches classically refer to the branching of the circulatory system or the respiratory system, but have been shown to also hold true for the branching of xylem, the water transport system in plants.

Murray's analysis facilitates a determination of the segment radius that minimizes expenditure of energy by the organism. Larger vessels lower the energy expended in pumping fluid (e.g. blood, water, and the like) because the pressure drop in the vessels reduces with increasing diameter according to the Hagen-Poiseuille equation. Larger vessels increase the overall volume of fluid flowing through the system. In the event, that the system is a vascular system (i.e., one that transports blood), increasing the flow of blood means increasing metabolic support. Murray's law helps balance these factors.

For n child segments arising from a common parent segment, the formula is:

$$r_p^3 = r_{c1}^3 + r_{c2}^3 + r_{c3}^3 + \ldots r_{cn}^3$$

where $r_p$ is the radius of the parent segment, and $r_{c1}$, $r_{c2}$, $r_{c3}$, and $r_{cn}$ are the radii of the respective child branches. From Murray's law, it may be seen that larger diameter tubes are heavier because of both the tubing and the additional volume of enclosed fluid, but the pressure losses incurred are reduced and so the mass of the pumping system that is used can be lower. The (inner) tube diameter $d_i$ which minimizes the total mass (tube+fluid+pump), is given by the following equation in laminar flow:

$$d_i^6 = \frac{1024\mu Q^2}{\pi^2 K [\rho TUBE(C^2 + C) + \rho FLUID]}$$

where Q is the volume flow rate, $\mu$ is the fluid viscosity, K is the power-to-weight ratio of the pump, $\rho$TUBE is the density of the tubing material, C is a constant of proportionality linking vessel wall thickness with internal diameter and the $\rho$FLUID is the density of the fluid.

For turbulent flow the equivalent relation is $$d_i^7 = \frac{80 Q^3 f \rho FLUID}{\pi^3 K [\rho TUBE(C^2 + C) + \rho FLUID]}$$

where $f$ is the Darcy friction factor. The junction relations above can therefore be applied in the following form in turbulent flow:

$$r_p^{7/3} = r_{c1}^{7/3} + r_{c2}^{7/3} + r_{c3}^{7/3} + \ldots r_{cn}^{7/3}$$

The binary image of the network is bifurcated down to approximately segments having diameters of approximately 5.0 micrometers. A conductance is calculated for each virtual network (binarized image) by using serial/parallel relationships for the different virtual segments. The conductances for parallel segments are added while the reciprocal of conductances for serial segments are added to produce an equivalent conductance. This method is used on the entire vascular network to determine a total equivalent conductance. If a pressure is assigned to the source node and a pressure assigned to the capillary level, a series of linear equations can be used to determine the flow rate and pressure at every segment and junction. If the flow rates and pressures are known through the entire network, the velocity, Reynolds number, shear rates and shear stresses can be calculated using fundamental fluid equations.

One the flow in each sub-region is calculated, hotter colors (e.g., reds) are assigned to regions of greatest flow, while less hotter colors (e.g., pink) are assigned to regions of flow that is lesser than that of the greatest flow, and so on. Regions having equivalent flow have the same color.

The health of the flow network can also be computed (or assigned a numerical value) based on the ratio of different colors and the amount of area occupied by a particular color. Assigning a numerical value to a network permits comparison of networks. For example two vascular systems may be compared with each other and a decision may be made as to the extent of disease of one of them. By studying a series of networks a scale can be created by grading the coloration on different networks. This scale can be used to quantify the extent of a diseased network.

Embodiments of the present disclosure can be implemented as logic executed in one or more computing devices. A computing device according to the disclosure can include at least one processor and a memory, both of which are in electrical communication with a local interface. To this end, the computing device may comprise, for example, at least one server computer or like device. The local interface may comprise, for example, a data bus with an accompanying address/control bus or other bus structure as can be appreciated.

Stored in the memory are both data and several components that are executable by the processor. In particular, stored in the memory and executable by the processor is an application implementing logic according to the present disclosure as well as potentially other applications. It is understood that there may be other applications that are stored in the memory and are executable by the processors as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory and are executable by the processor. In this respect, the term "executable" means a program file that is in a form that can ultimately be run by the processor. Examples of executable programs may be, for example, a compiled program that can be translated into machine code in a format that can be loaded into a random access portion of the memory and run by the processor, source code that may be expressed in proper format such as object code that is capable of being loaded into a random access portion of the memory and executed by the processor, or source code that may be interpreted by another executable program to generate instructions in a random access portion of the memory to be executed by the processor, etc. An executable program may be stored in any portion or component of the memory including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory is defined herein as including both volatile and nonvolatile memory and data storage components. Volatile components are those that do not retain data values upon loss of power. Nonvolatile components are those that retain data upon a loss of power. Thus, the memory may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor may represent multiple processors and the memory may represent multiple memories that operate in parallel processing circuits, respectively. In such a case, the local interface may be an appropriate network that facilitates communication between any two of the multiple processors, between any processor and any of the memories, or between any two of the memories, etc. The local interface may comprise additional systems designed to coordinate this communication, including, for example, performing load balancing. The processor may be of electrical or of some other available construction.

Although executable logic of an embodiment of the disclosure may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Also, any logic or application according to an embodiment of the disclosure that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

The data can be stored on the cloud and can be made accessible to specialists across the world. This will permit remote access of images and testing of patients in remote regions across the world. Storage of data on the cloud can be used to compare behavior or morphology in normal populations versus diseased populations and to aggregate such statistics in mass populations.

The system and method disclosed herein is used to evaluate automated fundus photographic analysis algorithms of a computer-assisted diagnostic system for grading diabetic retinopathy, to evaluate therapeutic responses of anti-angiogenic drugs in choroidal neovascularization, to evaluate optic neuritis along with degeneration of the retinal nerve fiber layer that is highly associated with multiple sclerosis, to evaluate ocular migraines associated with systemic vascular disease and high blood pressure, to evaluate the condition of blood vessels and/or nerves when affected by hypertension, chronic kidney failure, atherosclerosis, pulmonary diseases such as emphysema, chronic bronchitis, asthma, chronic obstructive pulmonary disease, interstitial lung disease and pulmonary embolism, cardiovascular diseases, myocardial infarction, aneurysms, transient ischemic attack, brain diseases, concussions, Alzheimer's disease and/or strokes.

Upon diagnosis of a particular disorder in the body's vascular system, the disorder may be treated by using one of the following: prescribing a course of treatment or therapy that involves the administering of dosages of medicine, deploying stents to improve the flow of vascular fluids, performing surgery, performing surgery that includes bypass surgery, construction of models to mimic the degradation of the vascular system, construction and replacement of a part of the body with synthetic prosthetics that replicate the existing diseased part, construction and replacement of a part of the body with synthetic prosthetics that are based on the use of constructal principles (which do not necessarily replicate the diseased part), and the like.

This disclosure also describes a method and software tool for providing visually-rich, quantitative information to interested individuals or groups, allowing for quick and effective decision-making based on the measured data. The method rapidly shows the spatial distributions of a resource or quantity spread among many sub-divided areas of a larger zone.

The uses of this disclosure are potentially as follows: Determining the amount of police officers (resource intensity) to devote to police precincts (areas of responsibility) across a metropolitan area based on historical and real-time crime data. Establishing the amount of power (resource intensity) moving through an electrical network serving locations of demand (areas of responsibility) helping to determine new powerline distribution paths. Measuring the amount of neural activity (resource intensity) inside a human brain and mapping it according to location inside the brain as a function of physical activity in order to study motor-neuron deficiency relationships. Counting the number of vehicles exiting interstate off-ramps based on exit location in order to plan next exit locations or devise new traffic-control schemes. In short, the system and method disclosed herein may be used to determine the amount of resources that need to be devoted to an area where the resources can be utilized. It can also be used to determine the time periods for which these resources are to be utilized as well as the frequency of utilization.

While this disclosure describes exemplary embodiments, it will be understood by those skilled in the art that various changes can be made and equivalents can be substituted for elements thereof without departing from the scope of the disclosed embodiments. In addition, many modifications can be made to adapt a particular situation or material to the teachings of this disclosure without departing from the essential scope thereof. Therefore, it is intended that this disclosure not be limited to the particular embodiment disclosed as the best mode contemplated for carrying out this disclosure.

What is claimed is:

1. A method comprising:
    imaging a network section through which flow occurs; where the flow is selected from a group consisting of fluid, electrons, protons, neutrons and holes; where the flow of fluid includes a vascular network section of blood vessels in a living being;
    partitioning the image into sub-regions based on metabolic need and function; where each sub-region comprises one or more sources and one or more sinks; where the flow emanates from the source and exits into the sinks;
    performing a Delaunay triangulation tessellation on one or more sub-regions by connecting one or more sources and one or more sinks; where the Delaunay triangulations maximize the minimum angle of all the angles of the triangles in the triangulation,
    generating a Voronoi diagram from the Delaunay triangulation by subdividing the sub-regions into Voronoi cells, where each Voronoi cell contains exactly one sink or one source; and where the intersections of Voronoi cells are Voronoi cell vertices;
    calculating a flow rate in each Voronoi cell; and
    according a color to Voronoi cells based on their flow rates; where Voronoi cells having similar rates are accorded similar colors.

2. The method of claim 1, further comprising assigning a numerical value to the network section based upon a summation of the colors.

3. The method of claim 1, further comprising comparing the network section with a new network section and detecting anomalies in the new network section.

4. The method of claim 1, further comprising creating a scale from which an extent of damage to a network can be listed.

5. The method of claim 1, where the vascular network is a part of the brain, the heart, the lung, or the eyes of a living being.

6. The method of claim 1, where the Voronoi cell vertex locations in space are points which are simultaneously equidistant from arterial sink locations.

7. The method of claim 1, further comprising comparing a parameter of the smoothed network with another network.

8. A system for performing a constructal analysis, the system comprising a processor and a memory to perform a method comprising:
    initiating capture of an image of an apparent random pathway, pattern, or network in a subject; where the apparent random pathway, pattern or network comprises a flow field; where the flow of fluid includes a vascular network section of blood vessels in a living being;
    partitioning the image into sub-regions based on metabolic need and function; where each region comprises one or more sources and one or more sinks; where the flow emanates from the source and exits into the sinks;
    performing a Delaunay triangulation tessellation on one or more sub-regions by connecting one or more sources and one or more sinks, where the Delaunay triangulations maximize the minimum angle of all the angles of the triangles in the triangulation;
    generating a Voronoi diagram from the Delaunay triangulation by subdividing the sub-regions into Voronoi cells, where each Voronoi cell contains exactly one sink or one source; and where the intersections of Voronoi cells are Voronoi cell vertices;
    calculating a flow rate in each Voronoi cell; and
    according a color to Voronoi cells based on their flow rates; where Voronoi cells having similar rates are accorded similar colors.

9. The system of claim 8, where the system is used to evaluate automated fundus photographic analysis algorithms of a computer-assisted diagnostic system for grading diabetic retinopathy, to evaluate therapeutic responses of anti-angiogenic drugs in choroidal neovascularization, to evaluate optic neuritis along with degeneration of the retinal nerve fiber layer that is highly associated with multiple sclerosis, to evaluate ocular migraines associated with systemic vascular disease and high blood pressure, to evaluate the condition of blood vessels and/or nerves when affected by hypertension, chronic kidney failure, atherosclerosis, pulmonary diseases such as emphysema, chronic bronchitis, asthma, chronic obstructive pulmonary disease, interstitial lung disease and pulmonary embolism, cardiovascular diseases, myocardial infarction, aneurysms, transient ischemic attack, brain diseases, concussions, Alzheimer's disease and/or strokes.

10. The system of claim 8, where the vascular network of blood vessels are present in a retina, a heart, a brain, breast, kidney, and/or a lung of a human being.

11. The system of claim 8, where the image is obtained using magnetic resonance imaging, computed tomography, ultrasound, ultrasound thermography, opto-acoustics, infrared imaging, positron emission tomography, or xray imaging.

12. The system of claim 8, where the image is further subjected to at least one of filtering, thresholding, digitization, and image and/or feature recognition.

13. The system of claim 8, further comprising deriving at least one quantitative measure from the smoothed network.

14. The system of claim 13, where the at least one quantitative measure is an end to end distance of the apparent random pathway, pattern, or network; an end to end distance of a portion of the apparent random pathway, pattern, or network; a radius of gyration of at least one branch or a plurality of branches of the apparent random pathway, pattern, or network; a persistence length of a branch or a plurality of branches of the apparent random pathway, pattern, or network; an average length between branches of the apparent random pathway, pattern, or network; an average branch length of the apparent random pathway, pattern, or network; an average orientation of the apparent random pathway, pattern, or network with respect to another apparent random pathway, pattern, or network; or the tortuosity of a branch or a plurality of branches of the apparent random pathway, pattern, or network.

* * * * *